S. N. MEYER.
COLLAPSIBLE RIM.
APPLICATION FILED DEC. 22, 1920.
1,428,386.
Patented Sept. 5, 1922.
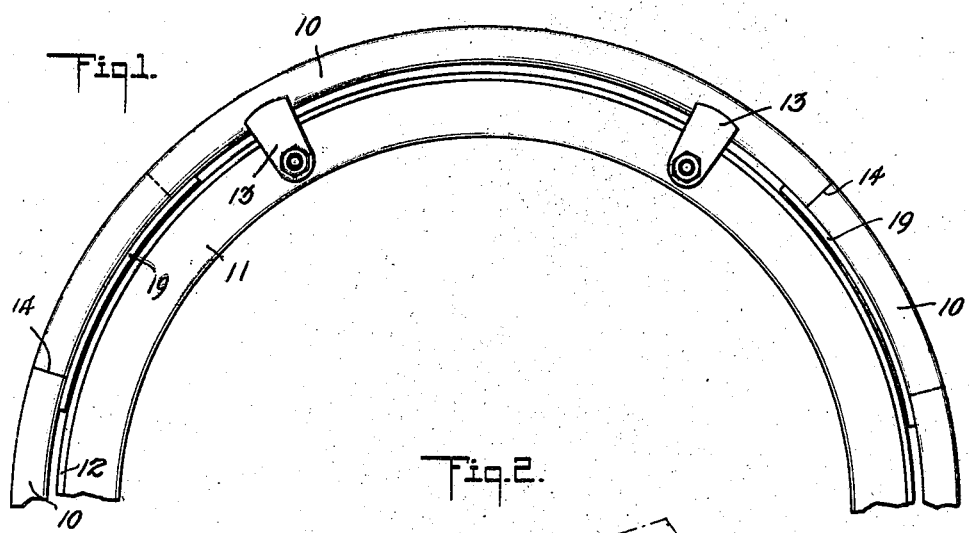
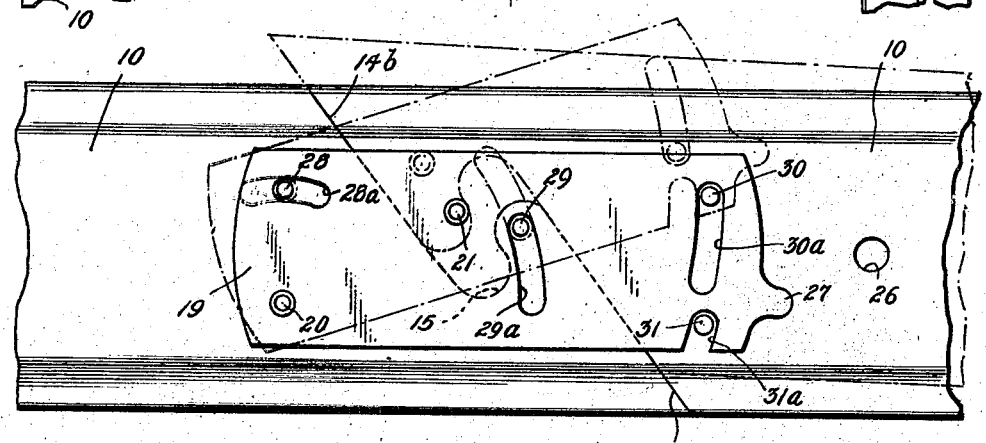
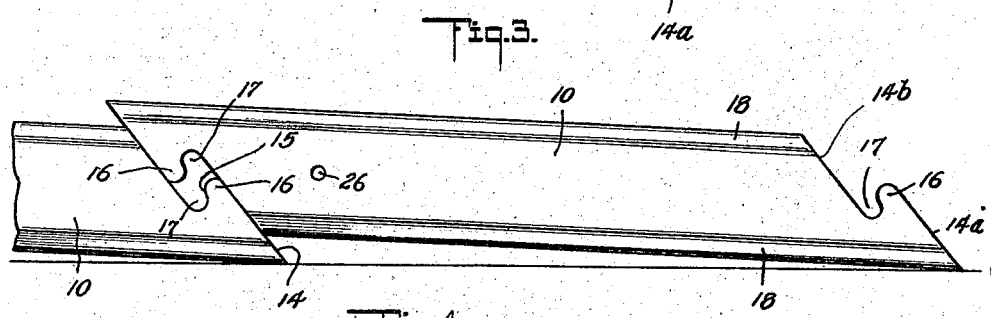
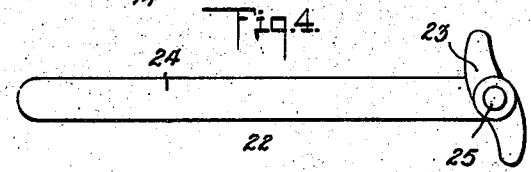
INVENTOR
S. N. Meyer
BY
Geo. L. Beeler
ATTORNEY Patented Sept. 5, 1922.

1,428,386

UNITED STATES PATENT OFFICE.

SAMUEL N. MEYER, NEW YORK, N. Y.

COLLAPSIBLE RIM.

Application filed December 22, 1920. Serial No. 432,505.

*To all whom it may concern:*

Be it known that I, SAMUEL N. MEYER, a citizen of Russia, but having declared my intention of becoming a citizen of the United States, and a resident of the city of New York, in the county of New York and State of New York, have invented certain new and useful Improvements in Collapsible Rims, of which the following is a specification.

This invention relates to vehicle wheels and has particular reference to rims for pneumatic tires for such wheels.

Among the objects of the invention is to provide a rim of metal or other suitable analogous material, so constructed as to hold any suitable or desired form of pneumatic tire in firm reliable position and condition, but which will enable the tire to be removed therefrom when desired with the least amount of effort and with no likelihood of damage to any part of the tire.

More specifically stated this invention contemplates the making of a tire rim having one or more diagonally arranged transverse cleavages, providing for the relative lateral movement of the adjacent ends of the rim on opposite sides of each cleavage and the simultaneous circumferential contraction or collapse of the rim. I am aware that the provision of a diagonal slit or cleavage in a rim is not broadly new, but I provide the cleavage in a peculiar form or design so as to establish a strong interlock when in set or closed position, in addition to the mechanism for manipulating the rim.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a side elevation of about one half of one of my improved rims shown in place diagrammatically on a wheel felly.

Fig. 2 is an inside or bottom plan view of a portion of my improved rim in locked or closed position of the ends on opposite sides of a cleavage, dotted lines indicating a change of position of the movable parts.

Fig. 3 is a diagram indicating the lateral shifting of two adjacent sections of the rim.

Fig. 4 is a plan view of a preferred form of tool which I employ for manipulating the rim.

Referring now more specifically to the drawings I show my improved rim as comprising any suitable number of sections 10 of arc shape and adapted to fit around any suitable form or construction of wheel felly 11, provided ordinarily with a metal band 12. Any suitable number or form of clips 13 may be employed to hold the rim on the wheel.

While I indicate a rim as being composed of at least three sections 10 it will be understood that this number might be more or less according to the diameter of the wheel, the depth of the flanges, the amount of contraction or collapse required, or other structural conditions. This description therefore henceforth will deal with the interlocking and manipulating means at each cleavage.

As indicated in Fig. 2 the rim is cut or otherwise formed with a cleavage 14, the two end portions of which at $14^a$ and $14^b$ are offset from each other and are preferably parallel and formed as straight lines. Following a line of cleavage from one side of the rim to the other it will be noted that there is an ogee curve formed at 15, the ends of which merge into the lines $14^a$ and $14^b$ respectively. This ogee curvature establishes for each abutting end of the rim a nose 16, overlapping a recess 17 of the same end, and adapted to project into and interlock in the depression of the other end in closed position. With the provision of any suitable means to prevent relative lateral movement between the two rim ends these interlocking noses and recesses constitute a rigid reenforcement or interlock serving to prevent relative endwise movement of the rim sections in either direction. The presence of an inflated tire in place between the flanges 18 of the rim, for instance, would serve to prevent such relative lateral movement of the rim sections.

19 indicates a keeper shown in the form of a plate of metal or the like made preferably of flat material in cross section and curved to harmonize with the curvature of the rim around the wheel. This keeper plate is pivoted permanently at 20 and 21 to the two abutting rim sections, the keeper extending across the line of cleavage or joint between said sections. The pivots 20 and 21 are so related to each other and the keeper that in the interlocked or set position of the rim sections the keeper lies parallel with the rim sections but the line between centers of the pivots lies at an angle of about 28° to the longer axis of the keeper. In other words, while the pivot 20 may be described as lying at one side of the longitudinal center of the keeper, the other pivot lies on the other side thereof. If now the keeper plate be swung around the axis of the pivot 20, the connection between the pivot 21 and the other section of the rim forces a relative lateral movement between the sections on opposite sides of the joint, and likewise, due to the fixed distance between the pivots, the two sections will be held in substantial contact with each other along the line of cleavage and so the rim will be reduced in length and collapsed. It will of course be understood that the tire will not be highly inflated when manipulating the rim.

Any suitable means may be provided to swing the keeper around its pivots. To this end I prefer the tool 22 shown in Fig. 4, the same comprising a head 23, a handle 24, and a pivot lug 25. With the lug 25 inserted into a hole 26 formed in one of the rim sections just beyond the keeper one or the other of the cams of which the head 23 is composed will wipe against a projection 27 and the end of the keeper. This same action being repeated with respect to all of the joints of the rim, the rim will be sufficiently collapsed for putting on or removing a tire with a minimum amount of effort. The rim sections subsequently will be extended into normal circular form and with all of the joints locked by a reverse movement of the tool.

Any suitable means may be provided to limit the swing of the keeper. To this end I show several pins 28, 29, and 30 projecting through associated slots $28^a$, $29^a$, and $30^a$ respectively. The slots $28^a$ and $29^a$ are concentric with the pivot 20, and the slot $30^a$ is concentric with the pivot 21. These pins as well as another pin 31 reenforce or strengthen the connection between the plate or keeper and the rim sections. The pin 31 co-operates with an open ended slot or notch $31^a$.

I claim:

1. A collapsible rim having a transverse joint, and a keeper pivoted to both rim sections on opposite sides of the joint and with the pivots also on opposite sides of the longitudinal center line of the rim, whereby when the keeper is swung laterally around one pivot the two abutting edges of the sections are compelled to slide in substantial contact with each other while the rim contracts in circumference.

2. A collapsible rim having a transverse joint produced by the development of an ogee curve at about the center of the joint, the convexities of the curve providing interlocking projections.

3. A collapsible rim having a transverse joint produced by the development of an ogee curve somewhere between the edges of the rim, the convexities of the curve providing interlocking projections, the abutting ends of the rim sections including also straight portions.

SAMUEL N. MEYER.